United States Patent [19]

Chen

[11] Patent Number: 5,326,283
[45] Date of Patent: Jul. 5, 1994

[54] ELECTRICAL PLUG FOR AUTOMOBILE USE

[75] Inventor: Tonny Chen, Changhua City, Taiwan

[73] Assignee: E Lead Electronic Co., Ltd., Changhua City, Taiwan

[21] Appl. No.: 101,563

[22] Filed: Aug. 3, 1993

[51] Int. Cl.⁵ ............................................. H01R 13/68
[52] U.S. Cl. .................................. 439/622; 439/638; 439/501
[58] Field of Search ............... 439/621, 622, 699, 700, 439/638, 639, 640, 501

[56] References Cited

U.S. PATENT DOCUMENTS

| | | |
|---|---|---|
| 4,109,988 | 8/1978 | Olson ................................... 439/622 |
| 4,248,494 | 2/1981 | McDonald et al. ................. 439/638 |
| 5,131,869 | 7/1992 | Wharton ............................. 439/622 |
| 5,201,677 | 4/1993 | Takayama ........................... 439/622 |

Primary Examiner—Gary F. Paumen
Attorney, Agent, or Firm—Browdy and Neimark

[57] ABSTRACT

An improved electric plug for automobile use is equipped with an extra extension cord sticking out of a side hole; and a cord fixing hook disposed at the periphery of the top end of the plug body; and a socket disposed at the top end of the plug body so as to permit another plug to be coupled thereto consecutively. The extension cord can be adjustably wound around the plug body with the cord retained by the cord fixing hook, permitting the length of the cord to be varied to meet different requirement in use.

2 Claims, 5 Drawing Sheets

ELECTRICAL PLUG FOR AUTOMOBILE USE

BACKGROUND OF THE INVENTION

The present invention relates to an improved electrical plug for automobile use, and more particularly to a plug equipped with more than one power supply outlet.

In general, the conventional electrical plug adapted for automobile use has only one power supply cord with one minor socket attached thereto. The plug is plugged into a major socket disposed on the panel of an automobile mainly used as a cigarette lighting means.

With the fast development of electric accessories widely applied to an automobile, such as action telephones, electric chargers, vedio cameras and radar detectors and objects of the like, the single major socket is not quite enough to meet the requirement any more. So, there is one specially designed type of plug available in the market, as shown in FIG. 1. This plug 11 is provided with a pair of extension cords 14, 15 to which are attached respectively a cigarette lighting means 12 and a power outlet 13. Although, this kind of plug offers an extra power supply cord, there are still some disadvantages associated therewith that are given as below:
1. The extension cords can not be received when not used, or adjusted in length for different purpose.
2. The pending cigarette lighting means can cause the loosening of the inserted plug, resulting in poor electrical conduction.

SUMMARY OF THE INVENTION

The primary object of the present invention is to provide an improved electric plug for automobile use which is comprised of a plug body having a side outlet at the periphery thereof so as to permit an extension cord extends therefrom; and a socket is disposed at the rear end thereof so as to permit another plug to be attached thereto.

Another object of the present invention is to provide an improved electric plug for automobile use which has a cord fixing hookdisposes at the periphery of the top end thereof whereby the extension cord can be adjustably wound around the plug and retained partially by the cord fixing unit.

DETAILED DESCRIPTION OF THE PREFERRED EMBODIMENT

Figure 1:
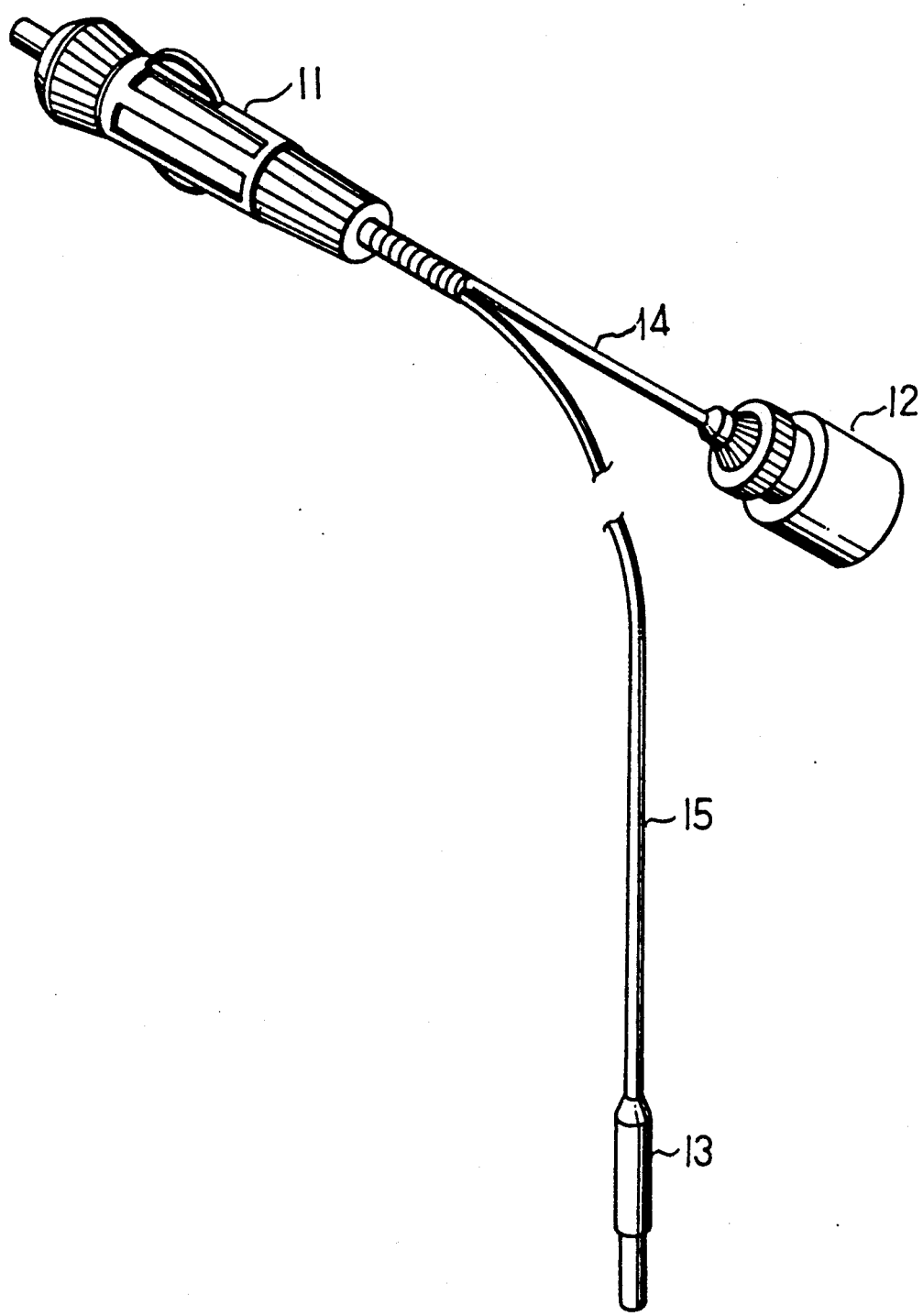
FIG. 1 is a diagram showing a prior art plug for automobile use.
Figure 2:
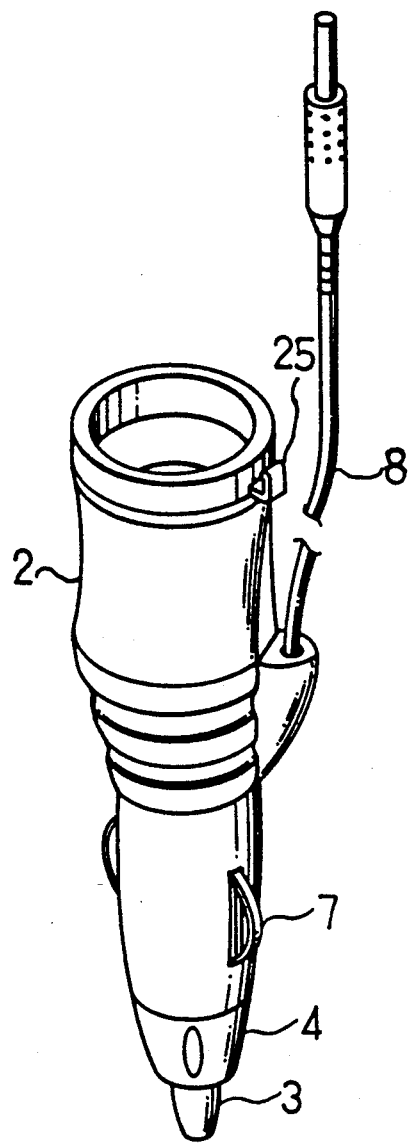
FIG. 2 is a diagram showing the structure of the present invention.
Figure 3:
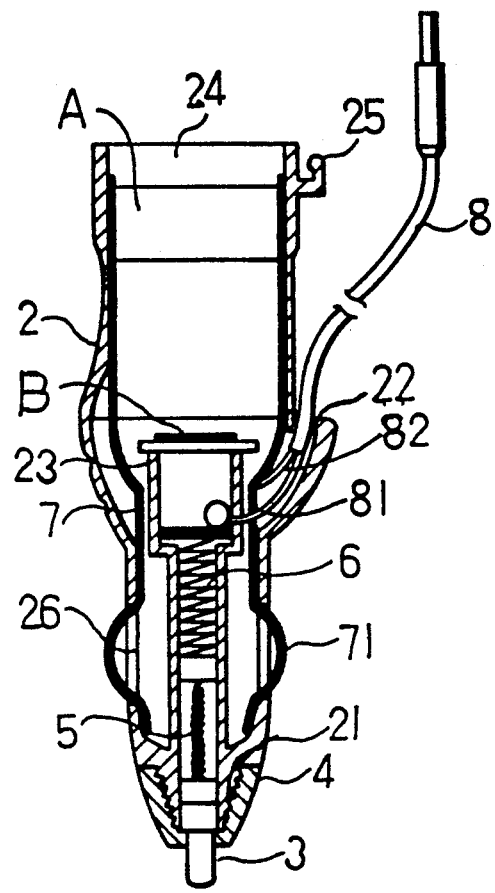
FIG. 3 is a sectional diagram showing the inner structure of the plug of the present invention.

Referring to FIGS. 2, 3, the present invention is comprised of a plug body 2 having a contact protrusion 3, a fuse 5 and a spring 6, the front end of the plug body 2 having outer threads 21, and a cap 4 removably secured to the front end. The contact protrusion 3, the fuse 5 and the spring 6 are consecutively housed inside the plug body 2 with the spring 6 in abutment against the conducting plate B of the base seat 23. The contact protrusion 3 abuts against the negative (positive) pole of the power source of an automobile when plugged, forming a positive or negative circuitry.

Near the front end of the plug body 2 is provided with a pair of slot-like openings 26 so that a pair of flexible conducting strips 7 each having an arc protrusion 71 can stick out of the openings 26 and abut against the positive (negative) pole of the power source. The ends of the conducting strips 7 are coupled to a conducting plate A disposed on the wall of the end of the plug body 2 so as to form a negative or positive circuitry.

An extension cord 8 having its positive wire 81 and a negative wire 82 connected to the conducting plate B and to one of the flexible conducting strip 7 respectively is led through a side hole 22 disposed on the periphery of the plug body 2, forming another power supply circuit.

Figure 4:
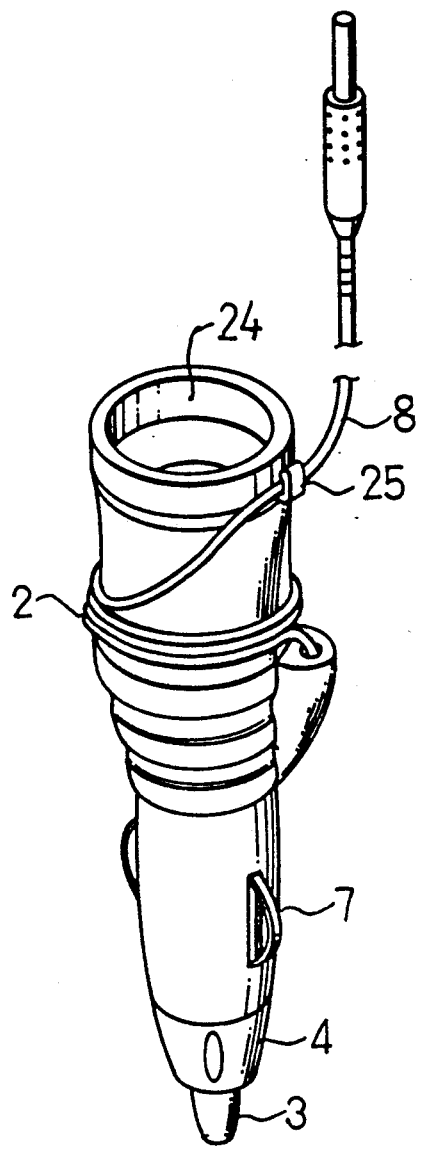
FIG. 4 is a diagram showing the extension cord being wound and retained in place by a fixing unit.

Referring further to FIG. 4, the extension cord 8 can be adjustably varied with the whole length thereof or excessive portion thereof winding around the plug body 2 and the cord 8 can be retained in place by a cord fixing hook 25 disposed on the periphery of the top end of the plug body 2.

Figure 5:
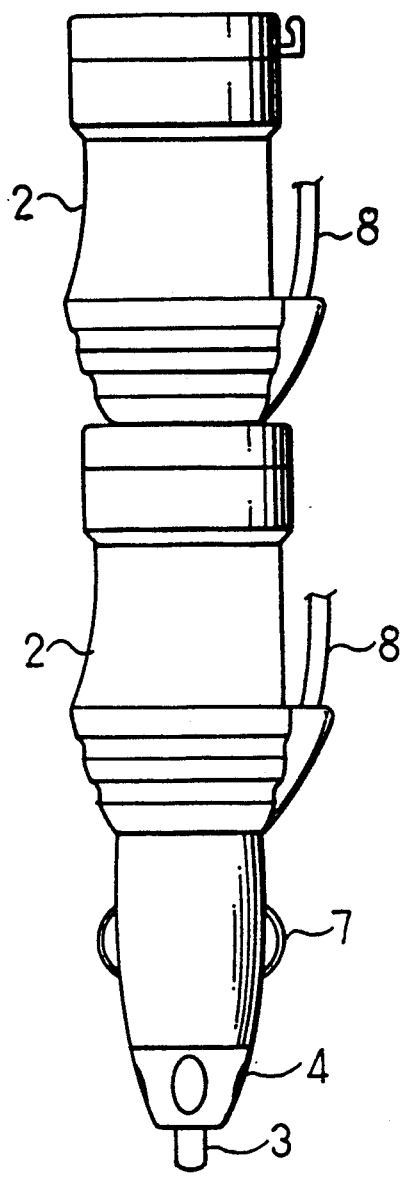
FIG. 5 is a diagram showing two plugs of the present invention being associated with each other end to end.

Referring to FIG. 5, the end of the plug body 2 has a socket 24, as shown in FIG. 3, engaged with the socket 24 is a plug of an electrical device or is another plug body 2 to which can be consecutively connected a number of plug body 2 so as to flexibly provide more power supply cords.

I claim:
1. An improved electric plug for automobile use, comprising a plug body; a pair of flexible conducting strips; a cap threadedly attached to one end of said plug body; a contact pin led through said cap; a fuse and a spring means disposed in contact with said contact pin consecutively and said spring abutting against a conducting plate of a base seat; said flexible conducting strips each having an arc protrusion sticking out of a slot-like opening on said plug body; and an extension cord having two wires one of which is connected to one of said flexible conducting strips and the other is connected to said conducting plate; said plug being characterized by that a side hole is disposed on the periphery of said body so as to permit said extension cord to extend out of said plug body, serving as another power supply source; said plug body is provided with a socket means at a top end thereof so as to permit either another plug of an electric device to be inserted therein or several said identical plug bodies to be consecutively connected end to end.

2. The improved electric plug as claimed in claim 1 wherein a cord fixing hook is disposed at the periphery of said plug body so as to permit said extension cord to be partly wound around said plug body and retained in place by said cord fixing hook.

* * * * *